United States Patent
Franke

(10) Patent No.: US 7,210,263 B2
(45) Date of Patent: May 1, 2007

(54) ROD JIGGING APPARATUS

(76) Inventor: Larry R Franke, 209 Oak Ridge Rd., Brandon, SD (US) 57005

( * ) Notice: Subject to any disclaimer, the term of this patent is extended or adjusted under 35 U.S.C. 154(b) by 0 days.

(21) Appl. No.: 10/885,299

(22) Filed: Jul. 7, 2004

(65) Prior Publication Data
US 2005/0050789 A1  Mar. 10, 2005

Related U.S. Application Data

(63) Continuation-in-part of application No. 10/339,888, filed on Jan. 10, 2003, now abandoned.

(51) Int. Cl.
*A01K 97/10* (2006.01)
*A01K 91/06* (2006.01)
(52) U.S. Cl. .......................... 43/19.2; 43/21.2
(58) Field of Classification Search .............. 43/19.2, 43/21.2, 15
See application file for complete search history.

(56) References Cited

U.S. PATENT DOCUMENTS

| | | | |
|---|---|---|---|
| 2,265,330 A | 12/1941 | Waddle et al. | |
| 2,724,569 A | 11/1955 | Licata | |
| 2,752,716 A | 7/1956 | Porter | |
| 2,924,038 A | 2/1960 | Dahlgren | |
| 3,001,314 A * | 9/1961 | Nahrstedt | 43/15 |
| 3,034,247 A | 5/1962 | Lunsman | |
| 3,074,674 A * | 1/1963 | Hill | 248/512 |
| 3,126,180 A | 3/1964 | Mandolare | |
| 3,187,456 A * | 6/1965 | Apitz | 43/19.2 |
| 3,546,805 A * | 12/1970 | Schaefer | 43/21.2 |
| 3,564,753 A * | 2/1971 | Fravel | 43/21.2 |
| 3,777,389 A * | 12/1973 | DeMino | 43/15 |
| 3,802,652 A * | 4/1974 | Holton, Jr. | 43/21.2 |
| 3,903,634 A | 9/1975 | Miyamae | |
| 3,939,592 A | 2/1976 | Johnson | |
| 4,033,062 A | 7/1977 | Denecky | |
| 4,081,922 A | 4/1978 | Johnson | |
| 4,085,536 A | 4/1978 | Wood, Jr. | |
| 4,204,355 A | 5/1980 | Almond | |
| 4,270,724 A * | 6/1981 | McMullen | 248/534 |
| 4,471,553 A * | 9/1984 | Copeland | 43/15 |
| 4,522,572 A | 6/1985 | Hahn | |
| 4,581,840 A | 4/1986 | Guith, II | |
| 4,650,146 A * | 3/1987 | Duke | 43/21.2 |
| 4,803,794 A * | 2/1989 | Lopez | 43/21.2 |
| 4,811,514 A | 3/1989 | Jordan | |

(Continued)

FOREIGN PATENT DOCUMENTS

SU    234790    5/1969

(Continued)

*Primary Examiner*—Darren W. Ark

(57) ABSTRACT

A rod jigging apparatus is disclosed for jigging one or more rods at the same time. The rod jigging apparatus includes a mounting member being designed for coupling to a support structure. An arm member selectively engages the mounting member whereby the arm member is designed for extending away from the support structure. At least one rod member is coupled to the arm member. The rod member is positioned opposite the mounting member. The rod member is designed for receiving a handle of a fishing rod whereby the arm member is for being pushed down and released by the user to jig the fishing rod positioned in the rod member.

4 Claims, 4 Drawing Sheets

U.S. PATENT DOCUMENTS

| | | | | |
|---|---|---|---|---|
| 4,835,896 A | * | 6/1989 | Bowen | 43/21.2 |
| 4,916,847 A | | 4/1990 | Rusgo | |
| 4,941,278 A | | 7/1990 | Verkuil | |
| 5,014,458 A | | 5/1991 | Wagner | |
| 5,076,001 A | | 12/1991 | Coon et al. | |
| 5,086,580 A | | 2/1992 | Redding | |
| 5,247,759 A | | 9/1993 | Noriega | |
| 5,435,093 A | | 7/1995 | Minorices et al. | |
| 5,437,122 A | | 8/1995 | Wilson | |
| 5,438,789 A | | 8/1995 | Emory | |
| 5,588,243 A | | 12/1996 | Caldwell | |
| D390,308 S | | 2/1998 | Sieland et al. | |
| 5,987,803 A | * | 11/1999 | White | 43/21.2 |
| D418,195 S | | 12/1999 | Perry | |
| 6,021,596 A | | 2/2000 | Heuke | |
| 6,301,820 B1 | * | 10/2001 | Rosa | 43/15 |
| 6,438,889 B1 | | 8/2002 | Handy | |
| 6,497,067 B1 | | 12/2002 | King | |
| 6,817,136 B2 | * | 11/2004 | Novak | 43/19.2 |
| 6,962,018 B1 | * | 11/2005 | King | 43/21.2 |

FOREIGN PATENT DOCUMENTS

| | | | | |
|---|---|---|---|---|
| SU | 234790 A | * | 5/1969 | 43/19.2 |
| SU | 1651810 | | 5/1991 | |
| SU | 1651810 A | * | 5/1991 | 43/19.2 |

* cited by examiner

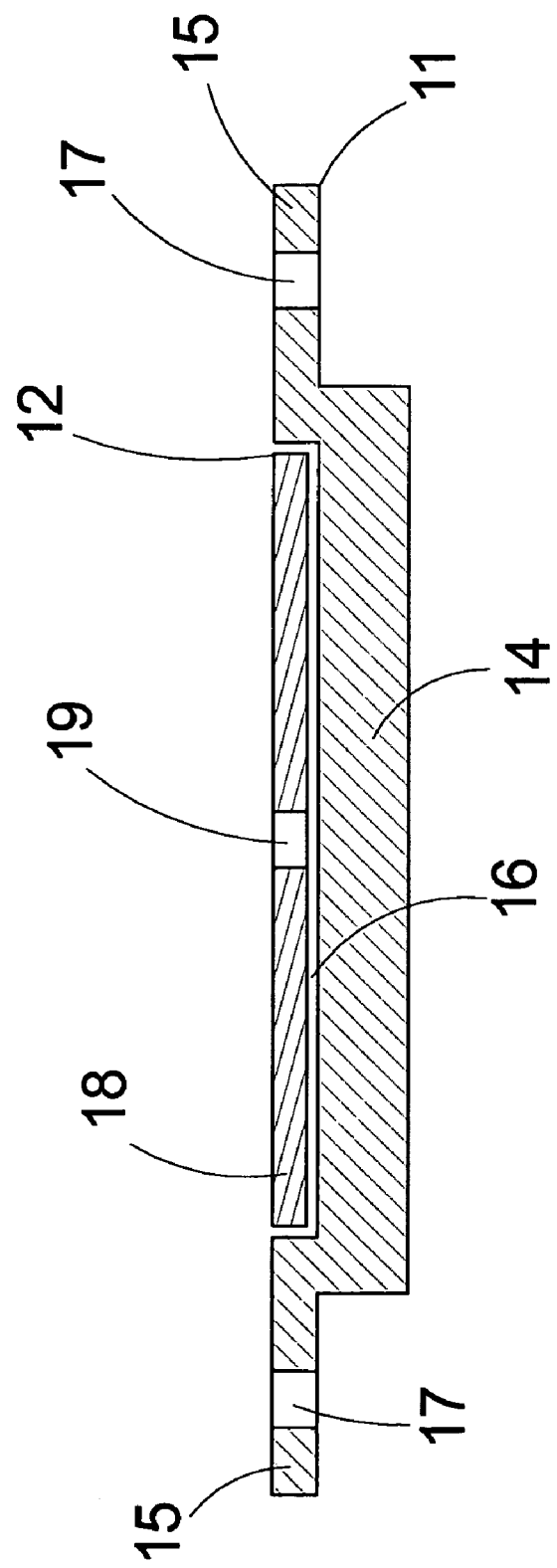

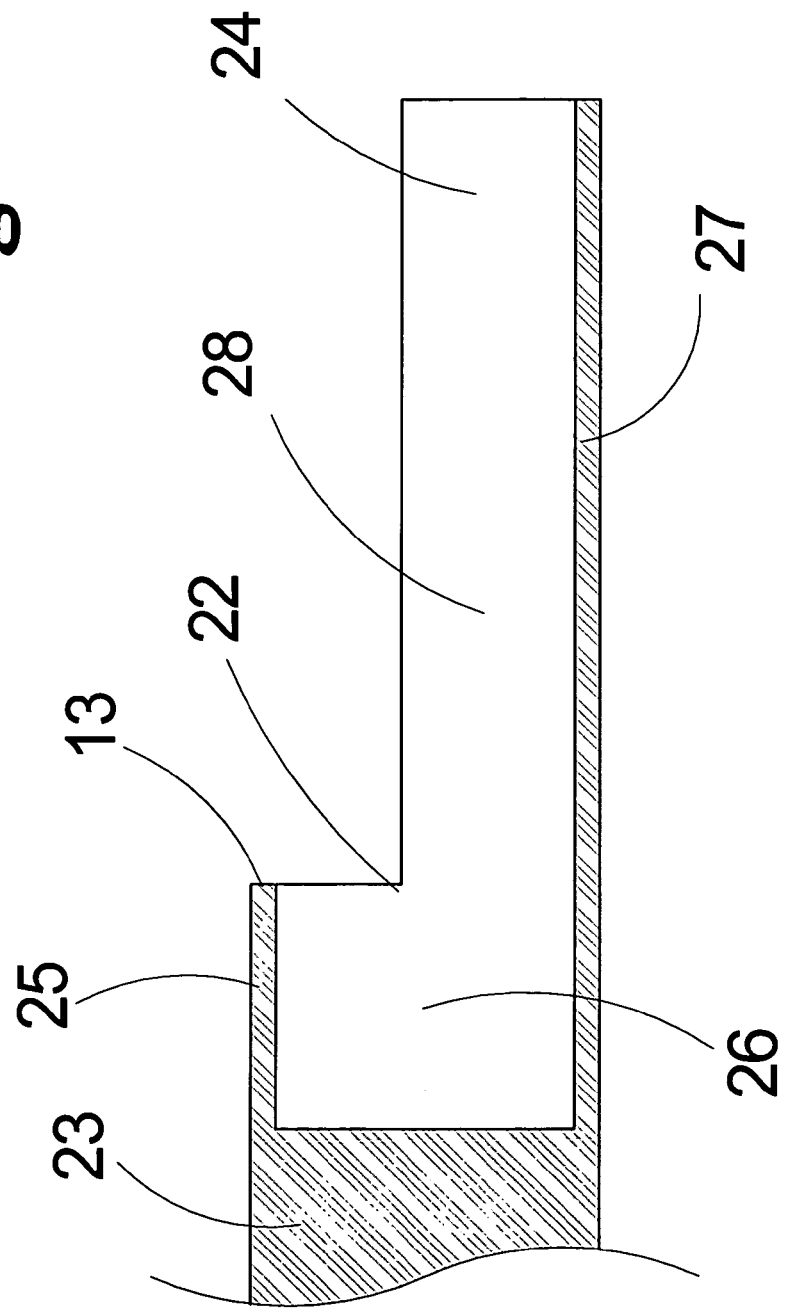

ROD JIGGING APPARATUS

REFERENCE TO RELATED APPLICATION

This application is a continuation-in-part of my U.S. patent application Ser. No. 10/339,888, filed Jan. 10, 2003, now abandoned.

BACKGROUND OF THE INVENTION

1. Field of the Invention

The present invention relates to jigging devices and more particularly pertains to a new rod jigging apparatus for jigging one or more rods at same time.

2. Description of the Prior Art

The use of jigging devices is known in the prior art. U.S. Pat. No. 6,021,596 describes a system for harnessing the wind to jig a fishing line. Another type of jigging devices is U.S. Pat. No. 4,581,840 having a fishing rod holder that is coupled to a foot pedal to allow the user to move the fishing rod holder and the fishing rod with the foot of the user to set the hook. U.S. Pat. No. 4,811,514 has a fishing jigger for being positioned in the ice and jigging a fishing line to attract fish. U.S. Pat. No. 5,435,093 has a device that receives a plurality of fishing rods and jigging the fishing rod simultaneously. U.S. Pat. No. 3,187,456 has an ice fishing device for supporting a fishing line in the water and indicating when the fishing line has been struck by a fish. U.S. Pat. No. 4,081,922 has an apparatus for jigging a pair of fishing lines while ice fishing. U.S. Pat. Nos. 4,916,847, 4,033,062, 5,086,580 and 3,126,180 each have a device for jigging a fishing line while the user is fishing. U.S. Pat. Nos. Des. 418,195 and Des. 390,308 each show a fishing rod holder.

While these devices fulfill their respective, particular objectives and requirements, the need remains for a device that has certain improved features allows the amount of jigging to be adjusted.

SUMMARY OF THE INVENTION

The present invention meets the needs presented above by providing a lever portion of an arm member that slides with respect to the mounting member to allow the amount of the lever portion extending from the mounting member control the amount the jigging.

Still yet another object of the present invention is to provide a new rod jigging apparatus that can easily be stored when not in use.

Even still another object of the present invention is to provide a new rod jigging apparatus that provides a support for the user to place a beverage container when the user is not jigging the fishing rods.

To this end, the present invention generally comprises a mounting member being designed for coupling to a support structure. An arm member selectively engages the mounting member whereby the arm member is designed for extending away from the support structure. At least one rod member is coupled to the arm member. The rod member is positioned opposite the mounting member. The rod member is designed for receiving a handle of a fishing rod whereby the arm member is for being pushed down and released by the user to jig the fishing rod positioned in the rod member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention taken along line 3—3 of FIG. 2.

FIG. 4 is a cross-sectional view of the present invention taken along line 4—4 of FIG. 2.

DESCRIPTION OF THE PREFERRED EMBODIMENT

Figure 1:
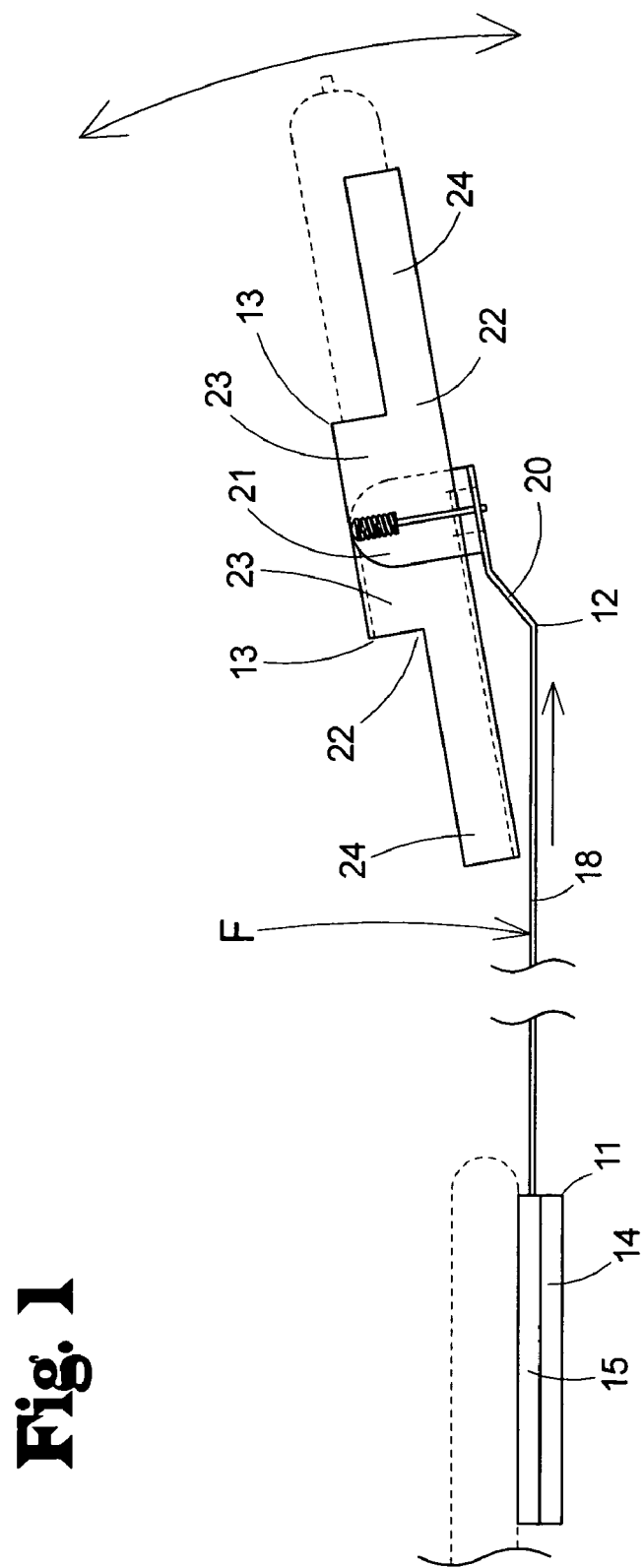
FIG. 1 is a side view of a new rod jigging apparatus according to the present invention shown in use.

With reference now to the drawings, and in particular to FIGS. 1 through 4 thereof, a new rod jigging apparatus embodying the principles and concepts of the present invention and generally designated by the reference numeral 10 will be described.

As best illustrated in FIGS. 1 through 4, the rod jigging apparatus 10 generally comprises a mounting member 11 being designed for coupling to a support structure. An arm member 12 selectively engages the mounting member 11 whereby the arm member 12 is designed for extending away from the support structure.

Figure 2:
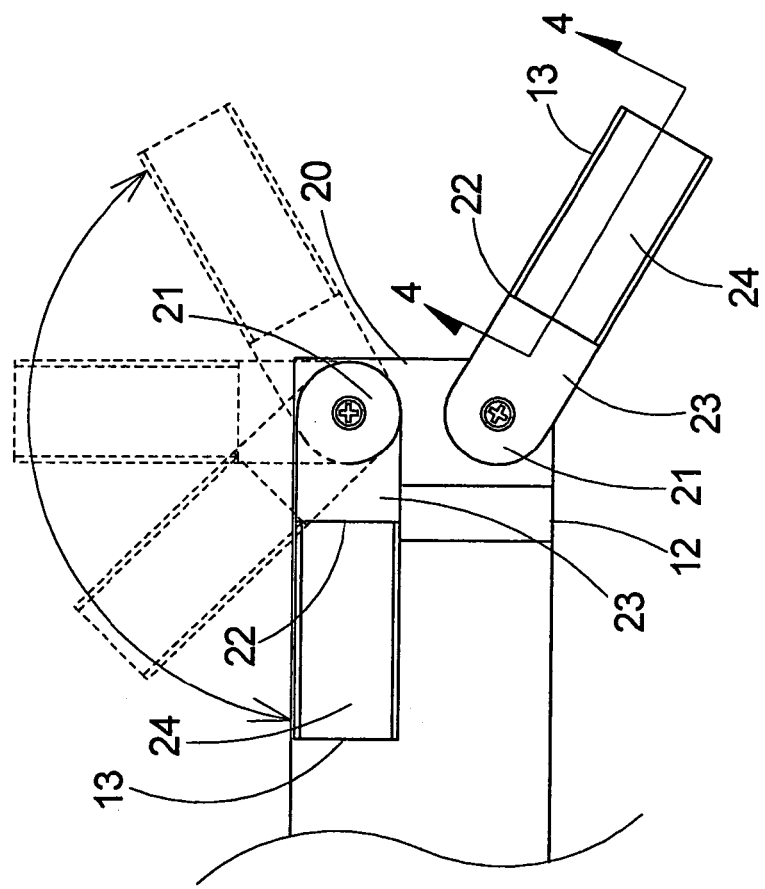
FIG. 2 is a top view of the present invention.
Figure 2:
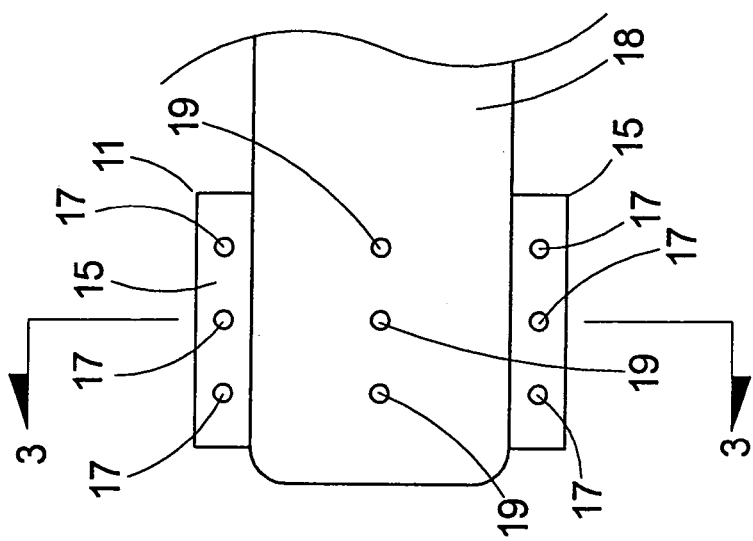

At least one rod member 13 is coupled to the arm member 12. The rod member 13 is positioned opposite the mounting member 11. The rod member 13 is designed for receiving a handle of a fishing rod. As shown in FIG. 2, a pair of the rod members 13 may be mounted on the arm member 12 for mounting a pair of fishing rods one the apparatus 10 at the same time.

The arm member 12 is formed of a resiliently flexible material for being able to be pushed down and released by the user to jig the fishing rod positioned in the rod member 13. In other words, the arm member 12 is resiliently flexible to finger pressure applied by the user to permit the user to push down on the arm member 12 to cause a portion of the arm member 12 to deflect from a neutral position (see FIG. 1), and then to release the arm member 12 to permit a rebounding of the deflected portion of the arm member 12 toward the neutral position for effecting a jigging of the fishing rod when the fishing rod is positioned in the rod member 13.

The mounting member 11 comprises a plate portion 14 and a pair of mounting portions 15. Each of the mounting portions 15 is coupled to the plate portion 14 whereby one of the mounting portions 15 is positioned opposite the other of the mounting portions 15. Each of the mounting portions 15 is designed for being coupled to the support structure whereby the arm member 12 is positioned between the plate portion 14 and the support structure when the arm member 12 engages the mounting member 11.

The mounting portions 15 and the plate portion 14 define a mounting channel 16 of the mounting member 11. The mounting channel 16 of the mounting member 11 slidably receives the arm member 12 whereby the arm member 12 is slid with respect to the mounting member 11 to change the amount of movement capable of the arm member 12 when the arm member 12 is pushed on by the user to change the amount the fishing rod is jigged.

Each of the mounting portions 15 of the mounting member 11 comprises a plurality of mounting apertures 17. Each of the mounting apertures 17 extends through the associated one of the mounting portions 15. Each of the mounting apertures 17 is designed for permitting one of a plurality of fasteners to extend through the mounting portions 15 to secure the mounting member 11 to the support structure.

The arm member 12 comprises a lever portion 18. The lever portion 18 slidably engages the mounting channel 16 of the mounting member 11 whereby the lever portion 18 extends from the mounting member 11. The lever portion 18 is designed for being pushed by the user to allow the user to jig the fishing rod positioned in the rod member 13. The lever portion 18 is designed for providing a support surface for a beverage container being used by the user when the user is not jigging the fishing rod. The lever portion 18 is selectively removable from the mounting member 11 for facilitating storage of the arm member 12 and the rod member 13.

The arm member 12 comprises a plurality of setting apertures 19. Each of the setting apertures 19 extends through the lever portion 18 of the arm member 12 whereby the setting apertures 19 are positioned along a portion of the length of the lever portion 18. Each of the setting apertures 19 is designed for providing a positioning reference to allow the user to position the lever portion 18 of the arm member 12 in a desired position when the arm member 12 engages the mounting member 11.

The arm member 12 comprises an extension portion 20. The extension portion 20 is coupled to the lever portion 18 of the arm member 12 whereby the extension portion 20 is positioned opposite the mounting member 11 when the arm member 12 engages the mounting member 11. The rod member 13 is coupled to the extension portion 20 of the arm member 12. The extension portion 20 extends at an angle from the lever portion 18 of the arm member 12 whereby the rod member 13 is designed for holding the fishing rod at an angle to inhibit the fishing rod be pulled from the rod member 13 when a fish is hooked.

The rod member 13 comprises a base portion 21 and an engaging portion 22. The engaging portion 22 extends outwardly from the base portion 21. The base portion 21 is pivotally coupled to the arm member 12 whereby the base portion 21 permits the rod member 13 to be pivoted between a deployed position and a storage position. The deployed position is defined by the engaging portion 22 of the rod member 13 extending outwardly from the arm member 12 whereby the engaging portion 22 is designed for receiving the fishing rod. The storage position is defined by the engaging portion 22 being positioned over the arm member 12 to facilitate storage of the arm member 12 and the rod member 13 when the arm member 12 is disengaged from the mounting member 11.

The engaging portion 22 of the rod member 13 comprises a sleeve 23 and a receiving cradle 24. The sleeve 23 is coupled to the base portion 21 of the rod member 13. The receiving cradle 24 extends from the sleeve 23 opposite the base portion 21 of the rod member 13. The sleeve 23 is designed for receiving an end of the handle of the fishing rod whereby the receiving cradle 24 cradles the handle of the fishing rod for permitting the user to quickly retrieve the fishing rod from the rod member 13 to set a hook when the user is fishing.

The sleeve 23 of the engaging portion 22 of the rod member 13 comprises a perimeter wall 25 defining a bore 26 extending into the sleeve 23 of the rod member 13. The bore 26 of the sleeve 23 is designed for receiving the end of the handle of the fishing rod when the rod member 13 is in the deployed position.

The receiving cradle 24 of the engaging portion 22 of the rod member 13 comprises a peripheral wall 27. The peripheral wall 27 defines a receiving channel 28 extending a length of the receiving cradle 24. The receiving channel 28 of the receiving cradle 24 is aligned with the bore 26 of the sleeve 23 whereby the receiving cradle 24 is designed for permitting the-handle of the fishing rod to be laid into the receiving channel 28 of the receiving cradle 24 when the end of the handle of the fishing rod is positioned in the bore 26 of the sleeve 23.

The rod member 13 comprises a polycarbonate material. The polycarbonate material is designed for resisting extreme temperatures and adverse weather conditions to inhibit damage to the rod member 13. The polycarbonate material is designed for being cut by a saw whereby a length of the engaging portion 22 is adjustable for being adjusted to fit the handle of the fishing rod.

In use, the user couples the mounting member 11 to a support structure, such as the bottom of a seat for a bait bucket or a top of a folding chair. The user then takes the arm member 12 and inserts the lever portion 18 into the mounting channel 16 of the mounting member 11 so that the lever portion 18 of the arm member 12 is positioned between the plate portion 14 of the mounting member 11 and the support structure. The user then slides the lever portion 18 with respect to the mounting portion so that a desired length of the lever portion 18 extends from the mounting member 11. The setting apertures 19 extending through the lever portion 18 are used to provide a reference for the user so that the user can quickly position the lever portion 18 of the arm member 12 to the correct length for jigging the fishing rod. Each rod member 13 is then rotated from the storage position to the deployed position. The end of the handle of the fishing rod is then placed into the bore 26 of the sleeve 23 then lowered into the receiving channel 28 of the receiving cradle 24. The user then pushes down on the lever portion 18 and releases the lever portion, which causes each rod member 13 to oscillate up and down briefly thereby jigging the fishing rod in each rod member 13. The receiving cradle 24 of each rod member 13 allows the user to quickly grasp the fishing rod to set the hook and inhibit the fishing rod from being pulled into the water by the fish.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rod jigging apparatus for jigging fishing rods when a user is ice fishing, the rod jigging apparatus comprising:
    a mounting member for coupling to a support structure;
    an elongate arm member mounted on the mounting member such that the arm member extends away from the support structure, the arm member having an inboard end and an outboard end, the inboard end being positioned adjacent to the mounting member;
    a rod-receiving member mounted on the arm member adjacent to the outboard end of the arm member and being positioned opposite the mounting member, the rod-receiving member defining a cavity for receiving a handle end of a fishing rod, the rod-receiving member being pivotally mounted on the arm member such that the rod-receiving member is pivotable between an extended position and a retracted position;
    wherein the arm member is resiliently flexible to finger pressure applied by the user to permit the user to push down on the arm member to cause a portion of the arm member to deflect from a neutral position, and to release the arm member to permit a rebounding of the deflected portion of the arm member toward the neutral position for effecting a jigging of the fishing rod when the fishing rod is positioned in the rod-receiving member;
    wherein the elongate arm member is slidably mounted on the mounting member to permit adjustment of a degree of extension of the outboard end of the arm member from the mounting member to change an amount of movement capable by the outboard end of the arm member when the arm member is pushed on by the user to change the amount the fishing rod is jigged;
    wherein the extended position of the rod-receiving member is characterized by the rod-receiving member extending beyond the outboard end of the arm member, the retracted position being characterized by the rod-receiving member extending toward the inboard end of the arm member;
    wherein the cavity of the rod-receiving member includes an open end for receiving the handle end of the fishing rod and a closed end abuttable against the handle end of the fishing rod when the rod is inserted into the cavity;
    wherein the open end of the rod-receiving member is defined by an edge of the rod-receiving member, the open end opening upwardly, the edge having a first semi-circular portion at the open end and a second semi-circular portion at a location between the open end and the closed end, the edge including a pair of side portions extending between the first and second semi-circular portions so that the rod-receiving member defines an upwardly opening trough;
    wherein the rod-receiving member comprises a first rod-receiving member and additionally comprises a second rod-receiving member, the second rod-receiving member being mounted on the arm member adjacent to the outboard end of the arm member and adjacent to the first rod-receiving member; and
    wherein the rod-receiving member comprises a polycarbonate material for resisting extreme temperatures and adverse weather conditions to inhibit damage to the rod member.

2. A rod jigging system for jigging a fishing rod for ice fishing, comprising:
    a seat support having an upper side for sitting upon and a lower side;
    a rod jigging apparatus mounted on the seat support, the rod jigging apparatus comprising:
    a mounting member mounted on the seat support;
    an elongate arm member mounted on the mounting member such that the arm member extends away from the support structure, the arm member having an inboard end and an outboard end, the inboard end being positioned adjacent to the mounting member;
    a rod-receiving member mounted on the arm member adjacent to the outboard end of the arm member and being positioned opposite the mounting member, the rod-receiving member defining a cavity for receiving a handle end of a fishing rod, the rod-receiving member being pivotally mounted on the arm member such that the rod-receiving member is pivotable between an extended position and a retracted position;
    wherein the arm member is resiliently flexible to finger pressure applied by the user to permit the user to push down on the arm member to cause a portion of the arm member to deflect from a neutral position, and to release the arm member to permit a rebounding of the deflected portion of the arm member toward the neutral position for effecting a jigging of the fishing rod when the fishing rod is positioned in the rod-receiving member;
    wherein the elongate arm member is slidably mounted on the mounting member to permit adjustment of a degree of extension of the outboard end of the arm member from the mounting member to change an amount of movement capable by the outboard end of the arm member when the arm member is pushed on by the user to change the amount the fishing rod is jigged;
    wherein the extended position of the rod-receiving member is characterized by the rod-receiving member extending beyond the outboard end of the arm member, the retracted position being characterized by the rod-receiving member extending toward the inboard end of the arm member;
    wherein the cavity of the rod-receiving member includes an open end for receiving the handle end of the fishing rod and a closed end abuttable against the handle end of the fishing rod when the rod is inserted into the cavity;
    wherein the open end of the rod-receiving member is defined by an edge of the rod-receiving member, the open end opening upwardly, the edge having a first semi-circular portion at the open end and a second semi-circular portion at a location between the open end and the closed end, the edge including a pair of side portions extending between the first and second semi-circular portions so that the rod-receiving member defines an upwardly opening trough;
    wherein the rod-receiving member comprises a first rod-receiving member and additionally comprises a second rod-receiving member, the second rod-receiving member being mounted on the arm member adjacent to the outboard end of the arm member and adjacent to the first rod-receiving member; and
    wherein the rod-receiving member comprises a polycarbonate material for resisting extreme temperatures and adverse weather conditions to inhibit damage to the rod member.

3. A rod jigging apparatus for jigging fishing rods when a user is ice fishing, the rod jigging apparatus comprising:
    a mounting member being adapted for coupling to a support structure;

an arm member selectively engaging the mounting member such that the arm member is adapted for extending away from the support structure;

a pair of rod members, each of the rod members being coupled to the arm member for receiving a handle of a fishing rod, each of the rod members being positioned opposite the mounting member;

the arm member being resiliently flexible for permitting the user to push down on and release the arm member to effect a jigging of the fishing rod when the fishing rod is positioned in one of the rod members;

the mounting member comprising a plate portion and a pair of mounting portions, each of the mounting portions being coupled to the plate portion such that one of the mounting portions is positioned opposite the other of the mounting portions, each of the mounting portions being adapted for being coupled to the support structure such that the arm member is positioned between the plate portion and the support structure when the arm member engages the mounting member;

the mounting portions and the plate portion defining a mounting channel of the mounting member, the mounting channel of the mounting member slidably receiving the arm member such that the arm member is slid with respect to the mounting member to change the amount of movement capable of the arm member when the arm member is pushed on by the user to change the amount that the fishing rod is jigged;

each of the mounting portions of the mounting member comprising a plurality of mounting apertures, each of the mounting apertures extending through the associated one of the mounting portions, each of the mounting apertures being adapted for permitting one of a plurality of fasteners to extend through the mounting portions to secure the mounting member to the support structure;

the arm member comprising a lever portion, the lever portion slidably engaging the mounting channel of the mounting member such that the lever portion extends from a forward edge of the mounting member, the lever portion being selectively deflected such that the lever portion deflects below the mounting member and the lever portion biases the arm member back into a neutral position when the lever portion is pushed and released by the user to allow the user to jig the fishing rod positioned in one of the rod members, the lever portion comprising a width greater than a width of one of the rod members such that the lever portion is adapted for providing a support surface for a beverage container between the rod members and the mounting member when the user is not jigging the fishing rod, the lever portion being selectively removable from the mounting member for facilitating storage of the arm member and the pair of rod members;

the arm member comprising a plurality of setting apertures, each of the setting apertures extending through the lever portion of the arm member such that the setting apertures are positioned along a portion of the length of the lever portion, each of the setting apertures being adapted for providing a positioning reference to allow the user to position the lever portion of the arm member in a desired position when the arm member engages the mounting member;

the arm member comprising an extension portion, the extension portion being coupled to the lever portion of the arm member such that the extension portion is positioned opposite the mounting member when the arm member engages the mounting member, each of the rod members being coupled to the extension portion of the arm member, the extension portion extending at an angle from the lever portion of the arm member such that each of the rod members are adapted for holding the fishing rod at an angle to inhibit the fishing rod from being pulled from one of the rod members when a fish is hooked;

each of the rod members comprising a base portion and an engaging portion, the engaging portion extending outwardly from the base portion, the base portion being pivotally coupled to the arm member such that each of the rod members are pivotable between a deployed position and a storage position, the deployed position being defined by the engaging portion extending outwardly from the arm member such that the engaging portion is adapted for receiving the fishing rod, the storage position being defined by the engaging portion being positioned over the arm member to facilitate storage of the arm member and the rod members when the arm member is disengaged from the mounting member;

the engaging portion of each of the rod members comprising a sleeve and a receiving cradle, the sleeve being coupled to the base portion, the receiving cradle being directly attached to and extending from the sleeve opposite the attachment of the base portion to the sleeve, the sleeve being adapted for receiving an end of the handle of the fishing rod such that the receiving cradle cradles the handle of the fishing rod for permitting the user to quickly retrieve the fishing rod from one of the rod members to set a hook when the user is fishing;

the sleeve of the engaging portion comprising a perimeter wall defining a bore extending into the sleeve, the bore of the sleeve being adapted for receiving the end of the handle of the fishing rod when one of the rod members is in the deployed position; and the receiving cradle of the engaging portion comprising a peripheral wall, the peripheral wall defining a receiving channel extending a length of the receiving cradle, the receiving channel of the receiving cradle being aligned with the bore of the sleeve such that the receiving cradle is adapted for permitting the handle of the fishing rod to be laid into the receiving channel of the receiving cradle when the end of the handle of the fishing rod is positioned in the bore of the sleeve.

4. The rod jigging apparatus as set forth in claim 3, wherein each of the rod members comprises a polycarbonate material for resisting extreme temperatures and adverse weather conditions to inhibit damage to the rod member, the polycarbonate material being capable of being cut by a saw such that a length of the engaging portion is adjustable for being adjusted to fit the handle of the fishing rod.

\* \* \* \* \*